J. H. McCOY.
APPARATUS FOR DISTRIBUTING BUILDING MATERIAL.
APPLICATION FILED NOV. 25, 1908.
942,403.
Patented Dec. 7, 1909.
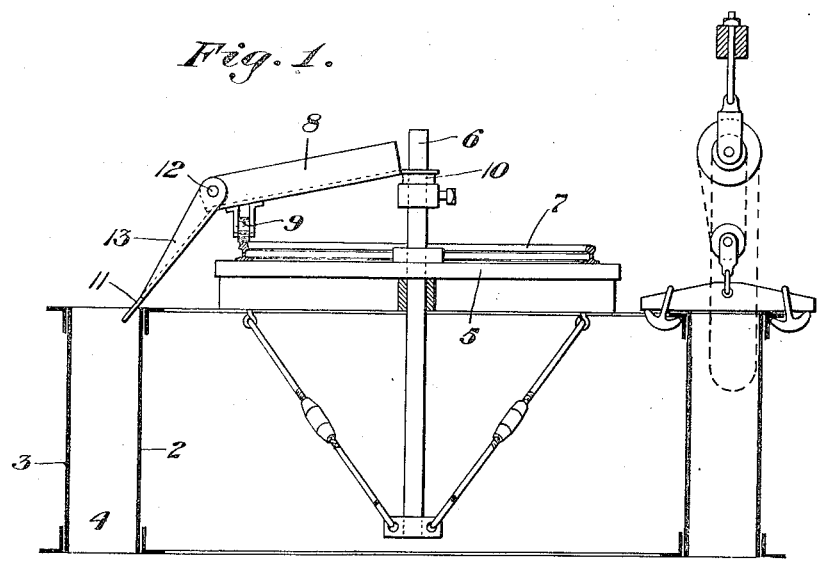
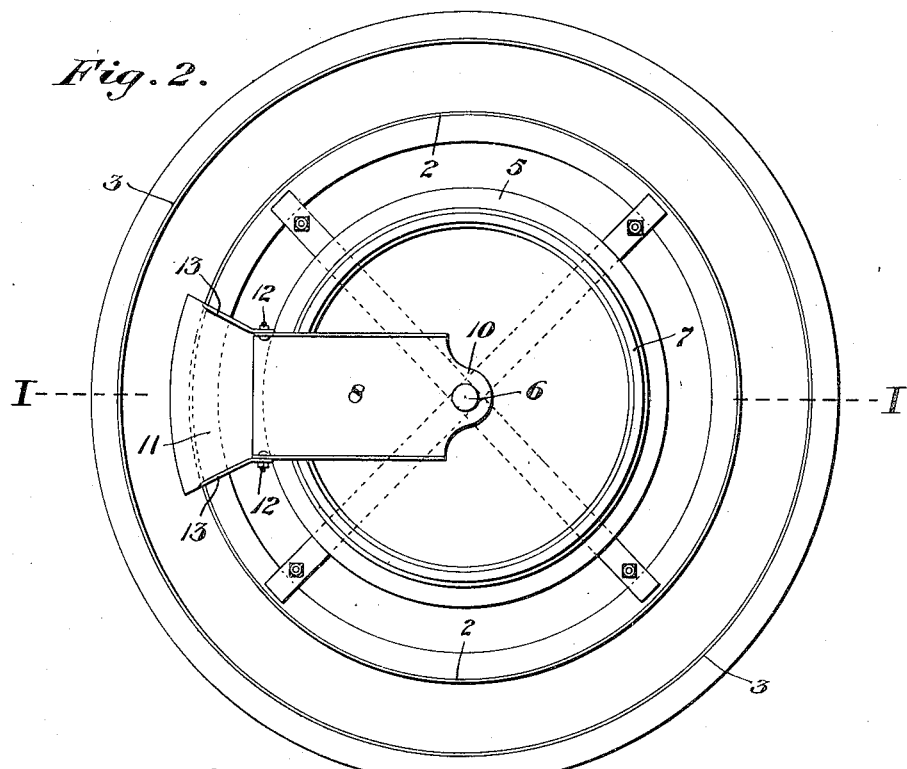
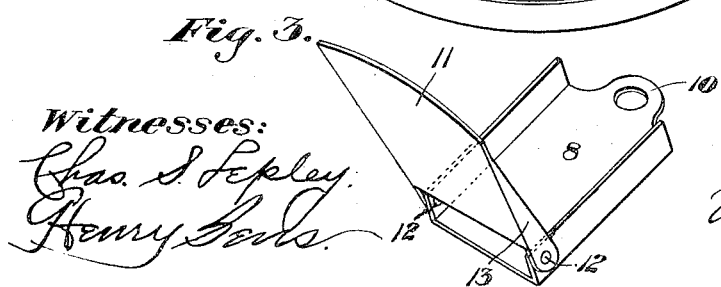

UNITED STATES PATENT OFFICE.

JOHN H. McCOY, OF HARRISVILLE, PENNSYLVANIA.

APPARATUS FOR DISTRIBUTING BUILDING MATERIAL.

942,403.  Specification of Letters Patent.  Patented Dec. 7, 1909.

Application filed November 25, 1908. Serial No. 464,450.

*To all whom it may concern:*

Be it known that I, JOHN H. McCOY, a citizen of the United States, residing at Harrisville, in the county of Butler and State of Pennsylvania, have invented certain new and useful Improvements in Apparatus for Distributing Building Materials, of which the following is a specification, reference being had therein to the accompanying drawing.

My invention consists of an improvement in apparatus for distributing building material in the building of cylindrical structures of concrete, as silos, of that class shown and described in my prior patent No. 837101 dated November 27, 1906.

The object of the invention is to provide convenient means for distributing the material around the annular wall forming cavity to build up the wall as is well understood, and is designed for the purpose of avoiding the necessity of handling the material in buckets, etc., and is particularly applicable to the type of apparatus shown in my said prior patent, employing a central platform.

In the drawings accompanying this application: Figure 1 is a vertical sectional view indicated by the line I. I. of Fig. 2 illustrating the device in operation. Fig. 2 is a plan view of Fig. 1. Fig. 3 is a detail view of the traveling adjustable trough showing the end spout thrown up.

In the drawings 2 and 3 represent the inner and outer boundary or molding walls of the apparatus between which the wall 4 is molded, said boundary walls consisting preferably of plates curved to the proper diameter and made in sections, adapted to be vertically adjusted for each successive section of wall, as is more fully shown and described in my companion application filed herewith.

5 represents a vertically adjustable platform adjusted successively upwardly and supported in any suitable manner, either by the upwardly extending posts built above the wall in its progress or by any other suitable means. Said platform is of substantial construction and of ample size to provide room for one or more attendants and is designed to receive the raw material from any suitable hoisting or elevating means as a conveyer, buckets, etc.

6 is a central post incorporated with the platform or framed into its timbers or otherwise, and surrounding said post is a concentric track 7 for the purpose of rotating the distributing trough. 8 indicates said trough provided with rollers or wheels 9 carried by suitable brackets or bearings underneath the trough and running on track 7. The trough is centered on post 6 by any suitable means as a centering bearing 10, and is provided at each side with upwardly extending flanges, the floor of the trough being preferably inclined downwardly as shown, at any desired angle.

11 is a supplemental extension of the main trough, pivotally hinged thereto at 12 by partial side portions 13 and hinge bolts extending through the side walls of the main trough. The lower edge of extension 11 is preferably flat or slightly curved to a radius corresponding to the radius of the annular cavity between walls 2 and 3, so that when lowered to the operative position in Fig. 1, the material thrown into the trough by the operator from the supply on the platform, will pass downwardly into said cavity, being distributed therein at the desired points around its circumference by shifting the trough upon its rolling bearings.

A particular advantage of the edge construction of supplemental trough 11 is that as the material rises within the cavity between the forming walls and incidentally above the lower edge of said supplemental trough, the trough will easily glide through it without binding, thereby facilitating its adjustment and permitting the cavity to be filled clear to the top. It will be understood that distribution of the material to the cavity is insured by allowing the supplemental trough to extend considerably below the top of the molding walls.

The operation will be readily understood from the foregoing description. The raw material having been delivered to platform 5, may be shoveled into the trough 8 and the trough adjusted from time to time to distribute it until a complete section is formed. The platform 5 is then raised and adjusted to its new position simultaneously with the upward adjustment of the molding walls 2 and 3 so that the walls, platform and trough practically constitute one connected operating construction.

When it is desired to stop the filling process or to retain any material within the trough, or to withdraw the supplemental extension out of the annular wall cavity, it may be thrown upwardly upon its hinges to the position indicated in Fig. 3.

The apparatus may be variously changed or modified in construction or various details by the skilled mechanic, but all such changes are to be considered as within the scope of the following claims.

What I claim is:—

1. The combination with a mold composed of inner and outer annular walls with an intervening space, and a platform supported upon the inner walls; of an annularly traveling distributing trough mounted on said platform and provided with a pivoted adjustable trough extension adapted to deliver material into the cavity between the walls, substantially as set forth.

2. The combination with a mold composed of inner and outer annular walls with an intervening space, and a platform supported upon the inner walls; of an annularly traveling distributing trough mounted on said platform and provided with a pivoted adjustable trough extension adapted to deliver material into the cavity between the walls having an edge substantially corresponding to the curvature of the wall cavity, substantially as set forth.

3. The combination with a supporting platform and an outer wall-forming annular mold composed of inner and outer shells and an intervening cavity, of a circular supporting track arranged around the top of the platform and a distributing trough mounted on said track for annular travel and distribution of material to the wall cavity, substantially as set forth.

4. The combination with a supporting platform, a surrounding annular mold, an annular track on the platform and a central post, of a distributing trough having supporting wheels mounted on said track and pivotally connected with the central post, substantially as set forth.

5. The combination with a supporting platform, a surrounding annular mold, an annular track on the platform and a central post, of a distributing trough having supporting wheels mounted on said track and pivotally connected with the central post, and provided with a pivoted distributing extension, substantially as set forth.

In testimony whereof I affix my signature in presence of two witnesses.

JOHN H. McCOY.

Witnesses:
C. M. CLARKE,
CHAS. S. LEPLEY.